United States Patent
Hahn et al.

(10) Patent No.: US 9,258,776 B2
(45) Date of Patent: Feb. 9, 2016

(54) METHOD AND APPARATUS FOR CONTROLLING A SMALL CELL ON OR OFF PROCEDURE FOR CAPACITY ENHANCEMENT

(71) Applicant: LG ELECTRONICS INC., Seoul (KR)

(72) Inventors: Genebeck Hahn, Seoul (KR); Jaehoon Chung, Seoul (KR); Hyeyoung Choi, Seoul (KR); Eunjong Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 14/181,135

(22) Filed: Feb. 14, 2014

(65) Prior Publication Data

US 2014/0228037 A1 Aug. 14, 2014

Related U.S. Application Data

(60) Provisional application No. 61/764,543, filed on Feb. 14, 2013.

(51) Int. Cl.
*H04W 52/02* (2009.01)
*H04W 52/00* (2009.01)
*H04W 36/04* (2009.01)

(52) U.S. Cl.
CPC .............. *H04W 52/00* (2013.01); *H04W 36/04* (2013.01); *H04W 52/0206* (2013.01); *Y02B 60/50* (2013.01)

(58) Field of Classification Search
CPC ............ H04W 36/04; H04W 36/0055; H04W 36/0072; H04W 36/20; H04W 36/24; H04W 88/08; Y02B 60/50
See application file for complete search history.

(56) References Cited

U.S. PATENT DOCUMENTS

| | | | | |
|---|---|---|---|---|
| 2011/0287755 A1* | 11/2011 | Cho | ................... | H04W 52/0225 455/418 |
| 2012/0115481 A1* | 5/2012 | Kim | ...................... | H04W 48/02 455/436 |

* cited by examiner

*Primary Examiner* — Quan M Hua
(74) *Attorney, Agent, or Firm* — Lee, Hong, Degerman, Kang & Waimey

(57) ABSTRACT

The present invention provides methods and apparatuses for supporting or controlling a small cell on or off procedure. One of the embodiment of the present application, the method comprises steps of receiving, by the MSC from a Source Small Cell (SSC), a cell indication message including a cell state change indication parameter indicating whether the SSC is to be off and a cell off timer parameter indicating a time duration for a cell off process; transmitting, by the MSC to the SSC, a cell off request message in order to accommodate an user equipment (UE) serviced from the SSC based on the cell state change indication parameter; and receiving, by the MSC from the SSC, an aggregated UE context transfer message requesting to perform a radio resource control (RRC) connection switching from the SSC to the MSC during a time duration indicated by the cell off timer parameter.

12 Claims, 10 Drawing Sheets

FIG. 3
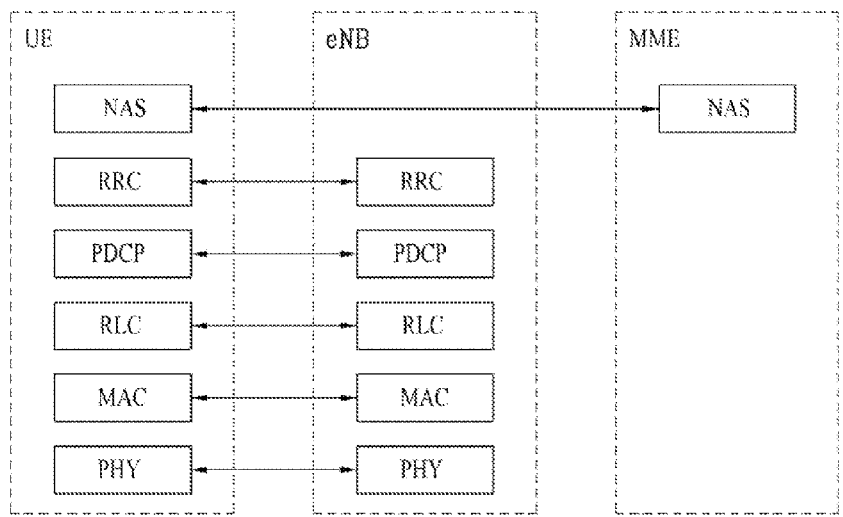
(a) Contol - plane protocol stack
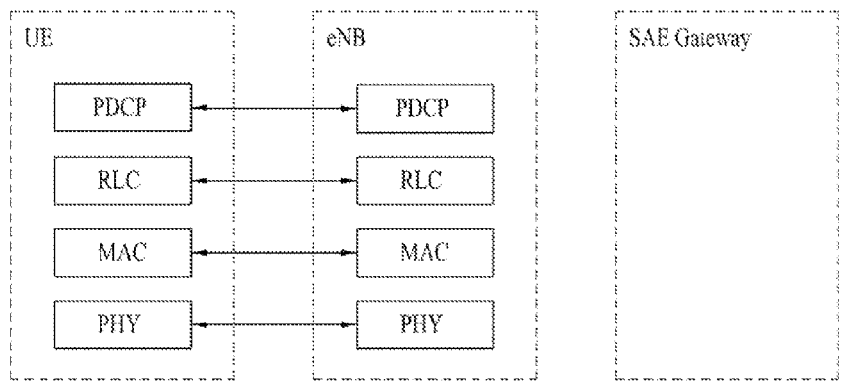
(b) User - plane protocol stack

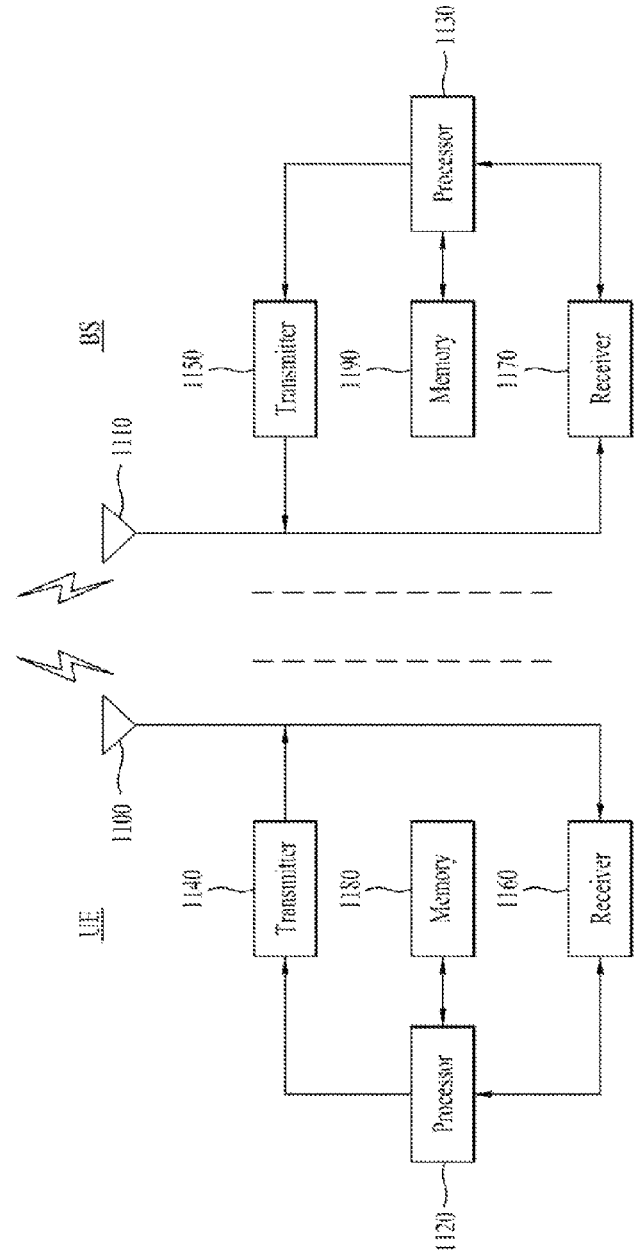

METHOD AND APPARATUS FOR CONTROLLING A SMALL CELL ON OR OFF PROCEDURE FOR CAPACITY ENHANCEMENT

CROSS-REFERENCE TO RELATED APPLICATIONS

Pursuant to 35 U.S.C. §119(e), this application claims the benefit of U.S. Provisional Patent Application Ser. No. 61/764,543, filed on Feb. 14, 2013, the contents of which are hereby incorporated by reference herein in its entirety.

BACKGROUND OF THE INVENTION

1. Field of the Invention

The present invention relates to a wireless access system, and more particularly, to a method for controlling or supporting a small cell on or off procedure and apparatus thereof.

2. Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Currently, it is expected that the trend of mobile wireless networks will be toward the denser deployment of small cells for capacity enhancement. By increasing the number of small cells, end-users can be physically located closer to the network and therefore, the data capacity would be significantly improved.

However, when considering the deployment of large number of small cells, some technical issues made from the differences between small cell and macro cell deployment should be carefully identified and solved. As an example, although the turn on or off of cells is an important characteristic for macro cell deployment in terms of energy saving, such an aspect should also be emphasized for small cell deployment. The reason is that the dynamic turn on or off of large number of small cells might have some RAN impacts.

SUMMARY OF THE INVENTION

An object of the present invention is to provide a method for saving energy and enhancing energy efficiency on the small cell deploy environment.

Another object of the present invention is to provide methods for supporting cell on/off procedures for adaptively providing service to the UEs.

Another object of the present invention is to provide methods for supporting cell on/off procedures which are controlled by a Macro Serving Cell (MSC).

Another object of the present invention is to provide a user equipment, a gate way and/or a base station supporting the above-described methods.

The objects achieved by the present invention are not limited to the above-described objects and those skilled in the art may consider other objects from the following description of the embodiments of the present invention.

The present invention relates to methods and apparatuses for supporting or controlling a small cell on or off procedure.

The object of the present invention can be achieved by providing a method for controlling a small cell off procedure by a Macro Serving Cell (MSC). The method comprises steps of receiving, by the MSC from a Source Small Cell (SSC), a cell indication message including a cell state change indication parameter indicating whether the SSC is to be off and a cell off timer parameter indicating a time duration for a cell off process; transmitting, by the MSC to the SSC, a cell off request message in order to accommodate an user equipment (UE) serviced from the SSC based on the cell state change indication parameter; and receiving, by the MSC from the SSC, an aggregated UE context transfer message requesting to perform a radio resource control (RRC) connection switching from the SSC to the MSC during a time duration indicated by the cell off timer parameter.

In another aspect of the present application, a method for controlling a small cell off procedure supported by a Source Serving Cell (SSC) comprises steps of transmitting, by the SSC to a Macro Small Cell (MSC), a cell indication message including a cell state change indication parameter indicating whether the SSC is to be off and a cell off timer parameter indicating a time duration for a cell off process; receiving, by the SSC from the MSC, a cell off request message in order to accommodate an user equipment (UE) serviced from the SSC based on the cell state change indication parameter; and transmitting, by the SSC to the MSC, an aggregated UE context transfer message requesting to perform a radio resource control (RRC) connection switching from the SSC to the MSC during a time duration indicated by the cell off timer parameter.

In still another aspect of the present application, a Macro Serving Cell (MSC) for controlling a small cell off procedure comprises a receiver, a transmitter, and a processor for controlling the small cell off procedure. In this case, the processor is configured to receive, from a Source Small Cell (SSC), a cell indication message including a cell state change indication parameter indicating whether the SSC is to be off and a cell off timer parameter indicating a time duration for a cell off process; transmit, to the SSC, a cell off request message in order to accommodate an user equipment (UE) serviced from the SSC based on the cell state change indication parameter; and receive, from the SSC, an aggregated UE context transfer message requesting to perform a radio resource control (RRC) connection switching from the SSC to the MSC during a time duration indicated by the cell off timer parameter.

The cell off request message may further include a time to start cell off parameter indicating when the cell off process is performed.

The methods may further comprise step of receiving a cell off complete indication message from the SSC after the SSC has been turned off.

The MSC may be a target base station which provides services on behalf of the SSC.

The aforementioned aspects of the present invention are merely some of the preferred embodiments of the present invention and various embodiments to which the technical features of the present invention are applied will be obtained and understood from the following detailed description by those skilled in the art.

According to the embodiments of the present invention, the following effects are obtained.

First, the energy efficiency of the whole network system can be increased since by controlling the cell on/off procedures. For example, if there are rare UEs in a specific small cell, the specific small cell can be turned off and a Macro cell which is located closely can provide the scheduling service to the UEs. Therefore, the energy efficiency can be increased and the network system can save energy compared to the prior network system.

Second, the UEs do not have to perform the legacy handover process when the cell on/off procedures are performed by using the proposed embodiments of the present application.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates the configurations of a radio interface protocol between the E-UTRAN and a UE.

FIG. 11 illustrates apparatus for implementing the method described in FIGS. 1 to 10.

DETAILED DESCRIPTION OF THE INVENTION

Figure 1:
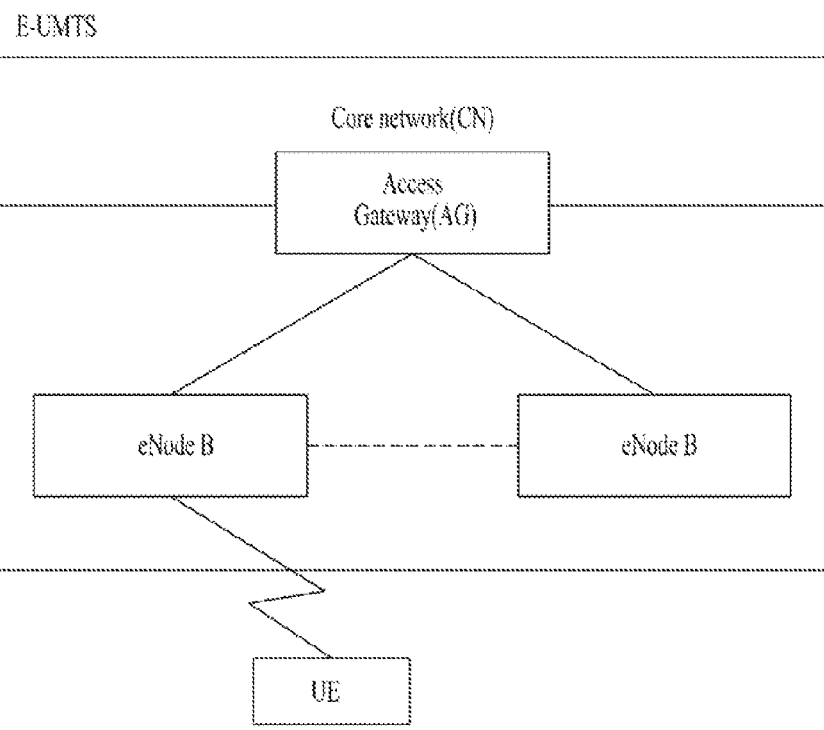
FIG. 1 illustrates a schematic structure a network structure of an evolved universal mobile telecommunication system (E-UMTS).

Embodiments of the present invention relate to methods for controlling or supporting a small cell on or off procedure and apparatus thereof.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), advanced base station (ABS), a macro cell, a small cell, or access point as necessary.

The term "terminal" may also be replaced with the term user equipment (UE), mobile station (MS), subscriber station (SS), mobile subscriber station (MSS), mobile terminal or advanced mobile station (AMS) as necessary.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP LTE system and the 3GPP2 system, all of which are wireless access systems. In particular, the embodiments of the present invention are supported by the standard documents such as the 3GPP TS 36.211, TS 36.212, TS 36.213, TS 36.321 and/or 3GPP TS 36.331, all of which are the standard documents of the 3GPP LTE system. That is, the steps or the portions of the embodiments of the present invention which are not described in order to clarify the technical spirit are supported by the above-described documents. All the terms disclosed in the present specification may be described by the above-described standard documents.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like.

CDMA may be embodied with radio technology such as UTRA (Universal Terrestrial Radio Access) or CDMA2000. TDMA may be embodied with wireless (or radio) technology such as GSM (Global System for Mobile communications)/ GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMax), IEEE 802-20, and E-UTRA (Evolved UTRA).

The UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. For clarity, the following description focuses on 3GPP LTE and LTE-A. However, the present invention is applicable to an IEEE 802.16e/m system.

1. General 3GPP LTE/LTE_A System

FIG. 1 illustrates a schematic structure a network structure of an evolved universal mobile telecommunication system (E-UMTS).

An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs. A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
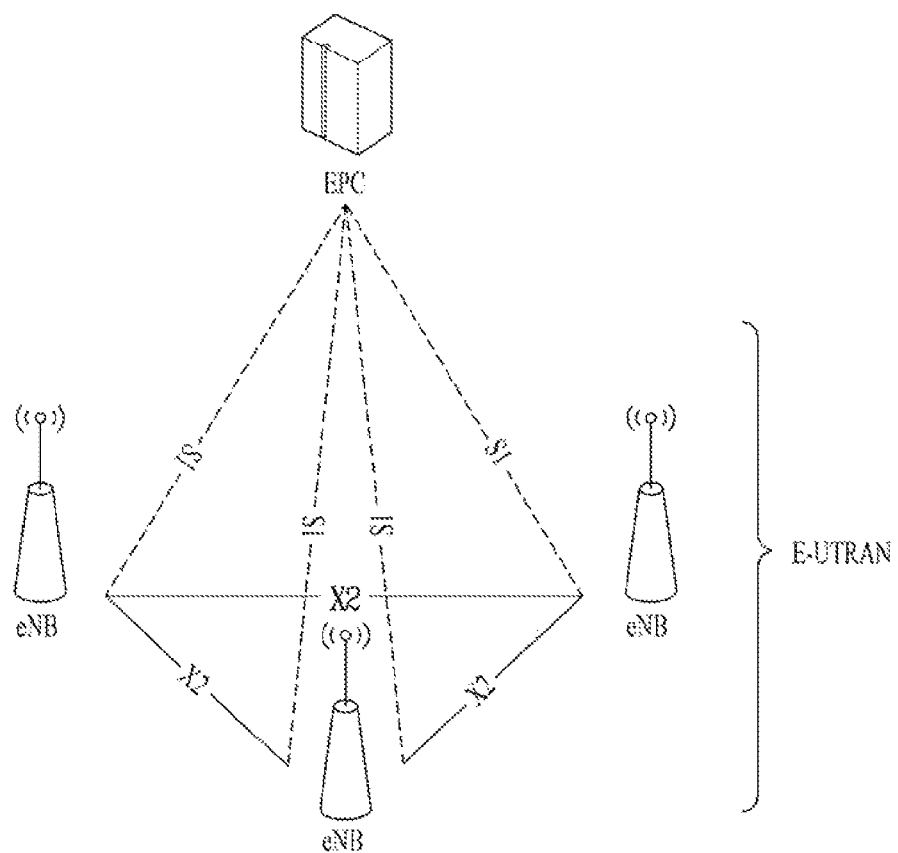
FIG. 2 illustrates a schematic structure of an Evolved Universal Terrestrial Radio Access Network (E-UTRAN).

FIG. 2 illustrates a network structure of an Evolved Universal Terrestrial Radio Access Network (E-UTRAN) system.

The E-UTRAN system is an evolved version of the conventional UTRAN system. The E-UTRAN includes base stations that will also be referred to as "eNode Bs" or "eNBs". The eNBs are connected through X2 interfaces. The X2 user plane interface (X2-U) is defined between eNBs. The X2-U interface provides non guaranteed delivery of user plane PDUs. The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like.

Each eNB is connected to User Equipments (UEs) through a radio interface and is connected to an Evolved Packet Core (EPC) through an S1 interface. The S1 user plane interface (S1-U) is defined between the eNB and the S-GW. The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

FIG. 3 illustrates the configurations of a control plane and a user plane of a radio interface protocol between the E-UTRAN and a UE based on the 3GPP radio access network standard.

The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. Multi-Carrier Aggregation Environment

A communication environment considered in the embodiments of the present invention includes all multi-carrier supporting environments. That is, a multi-carrier system or a multi-carrier aggregation system used in the present invention refers to a system for aggregating and utilizing one or more component carriers (CCs) having a bandwidth smaller than a target bandwidth, in order to support a target wide band.

In the present invention, multi-carrier refers to CA. CA includes both aggregation of contiguous carriers and aggregation of non-contiguous carriers. In addition, CA may be used interchangeably with the term "bandwidth aggregation".

Carrier Aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system.

For example, the existing LTE system may support bandwidths of 1.4, 3, 5, 10, and 20 MHz and an LTE_Advanced (LTE_A) system evolved from the LTE system may support a bandwidth greater than 20 MHz using only the bandwidths supported by the LTE system. Alternatively, the multi-carrier system used in the present invention may define a new bandwidth so as to support CA, regardless of the bandwidths used in the existing system.

The LTE-A system uses the concept of a cell in order to manage radio resources. The cell is defined as a combination of downlink resources and uplink resources, and the uplink resources are not mandatory. Accordingly, the cell may be composed of downlink resources alone or both downlink resources and uplink resources. If multi-carrier (that is, carrier aggregation) is supported, linkage between a carrier frequency (or a DL CC) of downlink resources and a carrier frequency (or a UL CC) of uplink resources may be indicated by a system information block (SIB).

A cell used in the LTE-A system includes a primary cell (PCell) and a secondary cell (SCell). The PCell refers to a cell operating on a primary frequency (e.g., a primary CC (PCC)) and the SCell refers to a cell operating on a secondary frequency (e.g., a secondary CC (SCC)). Only one PCell may be allocated to a specific UE and one or more SCells may be allocated to the specific UE.

The PCell is used to perform an initial connection establishment process or a connection re-establishment process at a UE. The PCell may be referred to as a cell indicated in a handover process. The SCell may be configured after radio resource control (RRC) connection establishment and may be used to provide additional radio resources.

The PCell and the SCell may be used as a serving cell. In the case of a UE which is in an RRC_connected state but in which CA is not set or a UE which does not support CA, one serving cell composed of only a PCell is present. In contrast, in the case of a UE which is in an RRC_connected state and in which CA is set, one or more serving cells may be present and all the serving cells include a PCell and one or more SCells.

After an initial security activation process begins, an E-UTRAN may configure a network which comprises a PCell that is initially configured in a connection establishment process and one or more SCells. In a multi-carrier environment, the PCell and the SCell may operate as respective CCs. That is, multi-carrier aggregation may be understood as being a combination of a PCell and one or more SCells. In the following embodiments, a primary CC (PCC) may be used as the same meaning as the PCell and a secondary CC (SCC) may be used as the meaning as the SCell.

3. Small Cell Deployment

According to section 2, a serving cell is described as the combination of DL and optionally UL resources. The linking between carrier frequency of DL resources and carrier frequency of UL resources is indicated in system information sent on the DL resources. In this case, a deployment where the capacity boosters can be distinguished from the cells offering basic coverage, the E-UTRAN cell providing additional capacity can be switched off in order to optimize the energy consumption when its capacity is no longer needed and to be re-activated on a demand basis.

3.1 Legacy Procedures

Hereinafter, the legacy procedures for a configuration update and a handover which performed by the UE and base stations.

Figure 4:
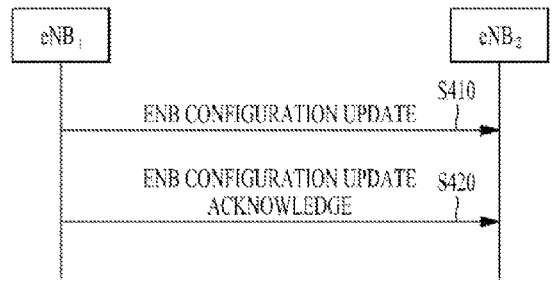
FIG. 4 illustrates the method for a legacy configuration update procedure between base stations.

FIG. 4 illustrates the method for a legacy configuration update procedure between base stations.

Referring to FIG. 4, the first base station (i.e., eNB1) initiates the procedure by sending an ENB CONFIGURATION UPDATE message to the second base station (i.e., eNB2) which is a peer base station. At this time, the ENB CONFIGURATION UPDATE message includes an appropriate set of up-to-date configuration data, including, but not limited to, the complete lists of added, modified and deleted served cells, the eNB1 has just taken into operational use (S410).

Upon reception of an ENB CONFIGURATION UPDATE message, eNB2 shall update the information for eNB1. In addition, after successful update of requested information, eNB2 shall reply with the ENB CONFIGURATION UPDATE ACKNOWLEDGE message to inform the initiating eNB1 that the requested update of application data was performed successfully (S420).

In this case, the peer eNB2 receives an ENB CONFIGURATION UPDATE without any IE except for Message Type IE it shall reply with the ENB CONFIGURATION UPDATE ACKNOWLEDGE message without performing any updates to the existing configuration.

In addition, the eNB1 may initiate a further eNB Configuration Update procedure only after a previous eNB Configuration Update procedure has been completed.

Figure 5:
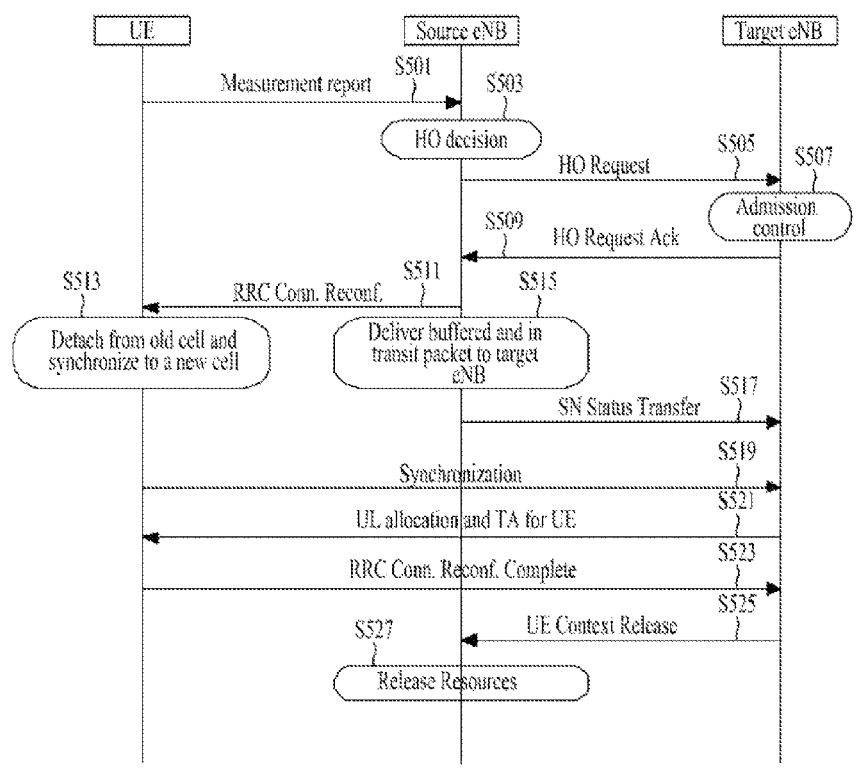
FIG. 5 illustrates one of the legacy connected mode handover methods.

FIG. 5 illustrates one of the legacy connected mode handover methods.

In FIG. 5, the network system comprises the UE, the source eNB, and the target eNB. In this case, the source eNB is a serving base station which is providing scheduling services to the UE and the target eNB is a target base station which the UE is willing to handover. In addition, the source eNB and the target eNB are the legacy base stations and macro base stations.

The network controls the UE mobility in RRC CONNECTED and for the network controlled mobility in RRC CONNECTED, handover is the only procedure which is currently defined. Generally, network triggers the handover procedure according to the radio conditions, and load. Such handover procedure is described in FIG. 5.

Referring to FIG. 5, the UE transmits the Measurement report message including a result of a measurement for neighboring cells to the source eNB (S501).

The source eNB is able to decide whether to perform the handover (HO) and the target eNB which the UE is to handover, and the source eNB transmits a HO request message to the target eNB in order to inform the HO (S503, S505).

The target eNB controls the admission of the UE and if the UE can be admitted, the target eNB transmits the HO request ACK message to the serving eNB (S507, S509).

The source eNB receiving the HO request ACK message transmit the RRC Connection Reconfiguration message to the UE for indicating to perform the HO procedure (S511).

The UE receiving the RRC Connection Reconfiguration message detaches from the old cell (i.e., the source eNB) and performs synchronization with the new cell (i.e., the target eNB), and the source eNB delivers buffered and in transit packet to the target eNB (S513, S515).

In order to transmit the buffered data or in transit packet, the source eNB transmit Sequence Number (SN) Status Transfer message to the target eNB (S517).

After that, the UE performs the synchronization procedure with the target eNB (S519), and the target eNB transmits uplink resources allocation information and timing advance (TA) information for the UE (S521).

The UE transmit the RRC Connection Reconfiguration complete message to the target eNB based on the uplink resource allocation information and the TA information (S523).

If the target eNB received the RRC Connection Reconfiguration complete message from the UE, the target eNB transmit the UE context release message requesting deletion of the information related to the UE (S525).

The source eNB receiving the UE context release message releases the resources for the UE and the HO procedure is completed (S527).

As described above, FIG. 5 illustrates legacy HO procedure which is performed by the UE. That is, whenever the eNB which provides scheduling service to the UE is changed, the UE should perform the handover procedure illustrated in FIG. 5. However, the method illustrated in FIG. 5 is not proper to the small cell environments. Because there are a lot of small cells will be deployed in a specific area (especially a cell area of the macro base station), if the UE perform the handover procedure of FIG. 5, the energy consumption of the UE will be extremely increased and the network overhead will also be increased.

Accordingly, by considering the deployment of future denser small cells, we think one of the features of such deployment is the dynamic on/off of small cells. To achieve this, current X2 procedure needs to be enhanced. Also, when we consider the deployment of small cells with dynamic on/off states, current handover mechanism needs to be optimized in terms of signaling overhead and latency. This is due to the intrinsic feature of small cells where the coverage of small cell is not so large and such feature inevitably results in frequent cell changes, e.g., handover between hyper-dense small cells.

3.2 Deployment Scenario of Small Cells

The important point of the present application is that a network controls the expanding or shrinking of small cell based on the information sent from the neighbor small cell that is going to be turned on or off soon. Such information can contain the period of turning on or off, the timing of turning on or off, etc.

Another point of proposed method is that network controls the mobility of RRC connected UE based on the information such as the state change due to the neighbor small cell on or off. The information can further contain the period during which the RRC connection should be switched to the target serving cell.

As an example, the target cell can be a serving cell that will expand its coverage and thus can provide service to the UEs on behalf of the source small cell. If the target cell is a Macro cell, the Macro cell can provide a service to the UEs on behalf of the source small cell. In such case, the source small cell can be a cell that will turn its power off soon and thus cannot give service to UEs. Alternatively, a source cell or a Macro cell can be a cell that will shrink its coverage and cannot accommodate the UEs in its coverage. In this case, a target cell can be a small cell that will turn its power on soon and can give service to the UEs on behalf of the source cell or the Macro cell.

In addition, in the embodiments of the present application, a macro cell represents a serving cell which is covered by the Macro eNB and a small cell represents a serving cell which is covered by the small eNB. In this case, the macro cell can be used as representative of the Macro eNB and the small cell can be used as representative of the small eNB.

Figure 6:
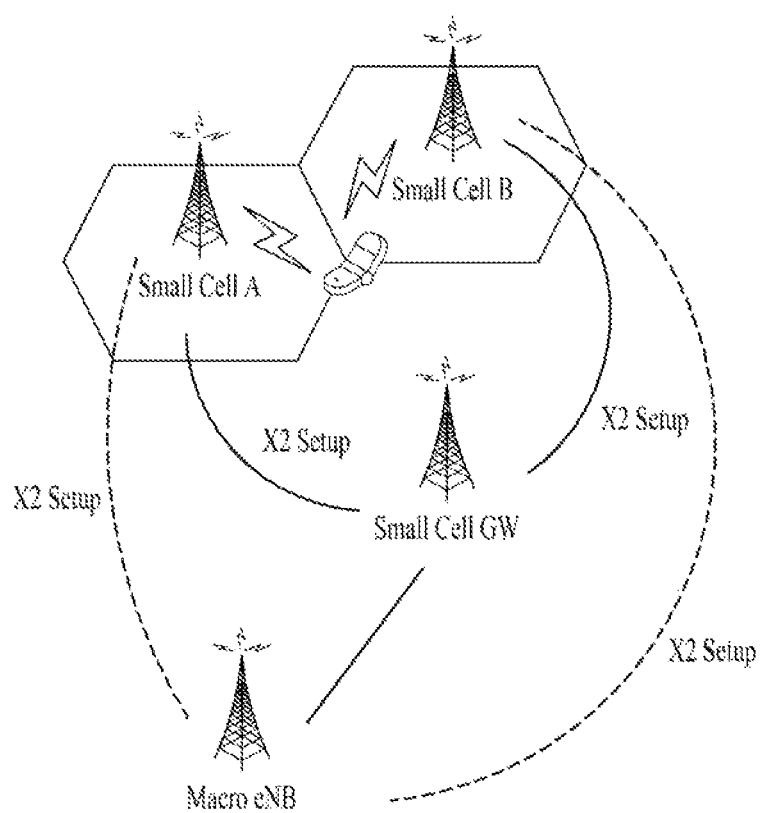
FIG. 6 illustrates the deployment scenario of a Macro cell controlled small cells with dynamic on or off states.

FIG. 6 illustrates the deployment scenario of Small Cell Specific Gateway controlled small cells with dynamic on or off states.

Referring to FIG. 6, there are 2 small cells A and B and 1 Macro eNB. Especially, FIG. 6 represents that the small cells are controlled by the S-GW (Small cell-GateWay).

As shown in FIG. 6, Macro eNB (MeNB) can have direct connectivity toward the small cells A and B. Alternatively, MeNB can have indirect connectivity toward the small cells A and B via the Small Cell GW. Assume that the small cells A and B are going to be turned off soon. In such case, the MeNB should accommodate and provide service to the UEs on behalf of the small cells A and B. On the other hand, in case the small cells A and B are going to be turned on again soon, the MeNB should leave the UEs back to the small cells A and B. The corresponding UEs then get service from the small cells A and B. All such coordination can be controlled by the MeNB.

The small cells can notify the MeNB about the state changes of their on/off. As an example, the small cells that will be turned off soon inform such state change to the Macro that should give service to the UEs on behalf of themselves. Alternatively, the small cells that will be turned on again notify such state change to the Macro that send the UEs back to themselves. For convenience, we describe the former set of small cells as on-and-off small cells. In this case, alternatively, the MeNB is able to detect the small cells on/off without such indication or notification from the small cells.

On the other hand, the small cells that will be turned off soon should notify the UEs in their coverage about the on/off state change and the information for RRC connection switching. The information can contain the identities of the MeNB or the macro cell that will accommodate the UEs on behalf of the small cells that will be turned off. Such information can further contain information of a period during which the UEs should finish RRC connection switching to the MeNB. This should be done after the source on-and-off small cells decide the MeNB for RRC connection switching and make a decision on RRC connection switching.

Similarly, the MeNB should notify the UEs in its coverage of the state change of neighbor small cells that will be turned on again and the information needed for RRC connection switching to the corresponding on-and-off small cells. Such information can contain the identities of small cells that will be turned on again soon and accommodate the UEs on behalf of the MeNB. Such information can further contain information of a period during which the UEs should finish a RRC connection switching to the corresponding on-and-off small cells. This should be done after the MeNB decides the small cells for RRC connection switching and makes a decision on the RRC connection switching.

The proposed methods of the present application should first be able to identify the on-and-off small cells. This can be done with the current X2 procedure, e.g., X2 Setup. More specifically, the property of small cells (i.e., on-and-off small cell) can be added into the X2 Setup message as an Information Element (IE) of the served cell Information. By doing this, the network can know about which small cells can act as on-and-off small cells. Such property of small cells can be informed to the neighbor small cells via other X2 procedures such as eNB Configuration Update, etc.

In case the MeNB detects that the on-and-off small cells will be turned off soon, it sends a message (e.g., a Cell Off Request message) to the on-and-off small cells in order to accommodate the UEs serviced by the corresponding small cells. Conversely, in case the MeNB detects that the on-and-off small cells will be turned on again soon, it transmits a message (e.g., a Cell On Request message) to the on-and-off small cells for leaving the UEs back to corresponding on-and-off small cells. All information exchange mentioned above can be done either via X2 interface (wired) or air interface (wireless) between network entities such as the MeNB and the Small Cells. Also, all information exchange can be done either through direct X2 interface or indirect X2 interface through Small Cell GW between the MeNB and the small cells.

In case a source small cell is going to be turned off soon, for all RRC connected UEs in itself, it transmits to the MeNB the Aggregated UE Contexts such as E-UTRAN Radio Access Bearer (E-RAB) QoS information and access stratum configuration information, etc. The transfer of such information should be done before the source small cell starts turning its power off. Also, the transfer of such information should be done after the source small cell finishes turning its power on.

The sending of Aggregated UE Context can be interpreted by the receiving entity as an implicit RRC connection switching request. After the source small cell broadcasts all the RRC connected UEs of its state change and target serving cell (i.e., the MeNB) related information, the source small cell sends the Aggregated SN Status of regarding UEs to the MeNB. Similarly, after the MeNB broadcasts all the RRC connected UEs about the neighbor small cell's state change and the corresponding source small cell related information, it sends the Aggregated SN Status of regarding UEs to the source small cell.

When the UEs receive the information required for RRC connection switching via broadcasting, they start synchronization to the Macro cell and/or source small cell. After completing RRC connection switching to the Macro cell or the source small cell, the UEs can resume communication.

Finally, the Macro cell and/or the source small cell send an UE Context Release message to the source small cell and/or the MeNB for the source small cell or the MeBN to release the related UE contexts.

Hereinafter, embodiments of the present application will be described in detail based on attached Figures.

3.3 Small Cell Off Procedures

Figure 7:
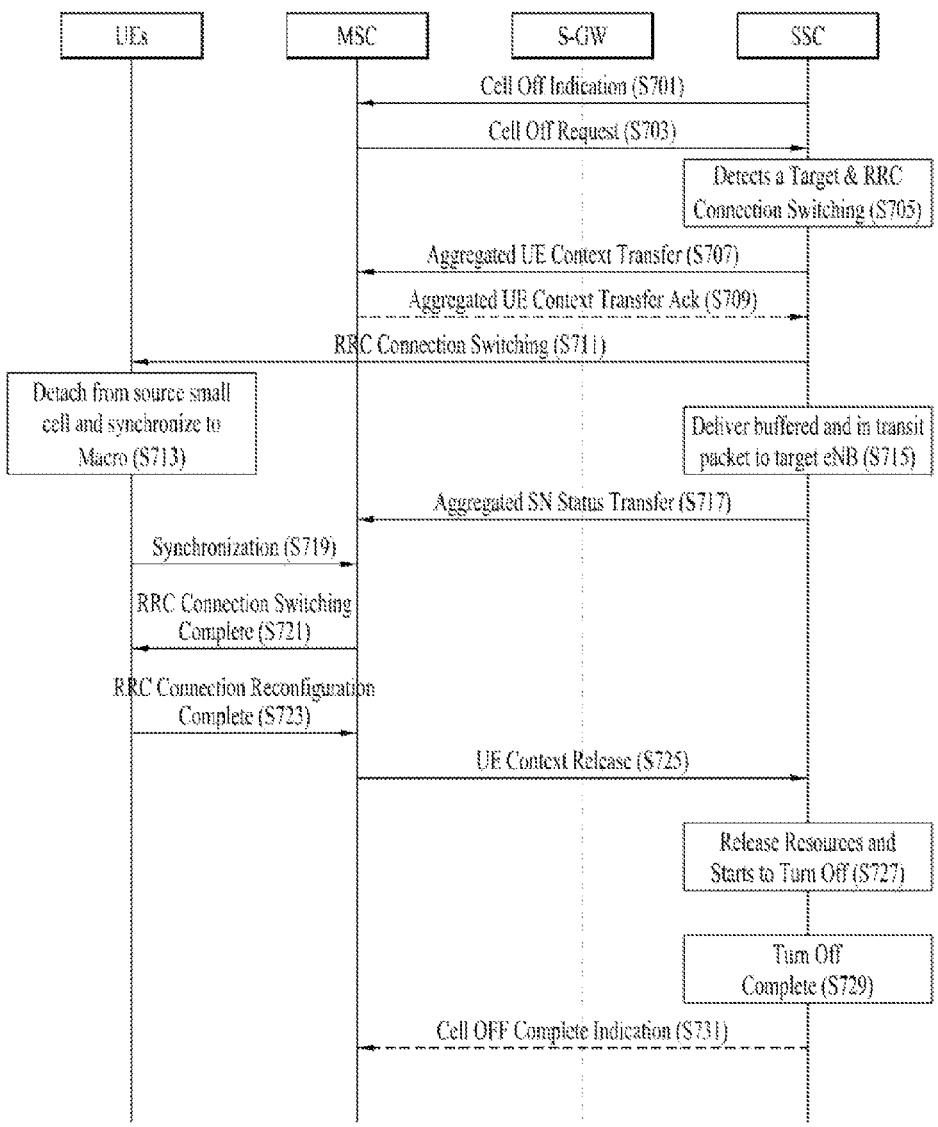
FIG. 7 illustrates a cell off procedure controlled by a MeNB.

FIG. 7 illustrates a cell off procedure controlled by a MeNB.

The network of FIG. 7 includes the Small cell Gate Way (S-GW), one MeNB, one or more source small cells (SSCs) and one or more UEs. However, for convenience of explanation of the present invention, FIG. 7 depicts just one SSC and one MeNB but there exist un-shown SSCs. In addition, the SSC is going to attempt turn off soon and the MeNB is going to provide the service to the UEs on behalf of the SSC. In this case, the MeNB can be referred to a macro serving cell (MSC), a target serving cell or a first cell, and the SSC can be referred to an on-and-off small cell or a second cell.

Referring to FIG. 7, the SSC which is going to turn off soon transmit a Cell Off Indication message to the MSC in order to notify the turn off state. The Cell Off Indication message includes a Cell State Change Indication parameter indicating the cell status, a Time to Start Cell Off parameter, a Cell Off Timer parameter, and a few of other necessary information. As an example, such information can contain the information needed for admission control at the MSC (S701).

By receiving the Cell Off Indication message, the MSC can detect that the SSC which is the on-and-off small cell will be turned off soon by decoding the cell state change indication parameter. When the MSC detects that the SSC will be turned off soon, it sends the Cell Off Request message to the SSC in order to accommodate the UEs serviced from the corresponding SSC. This can be transferred via air interface or the S-GW. The Cell Off Request can be the return message for the Cell Off Indication message from the SSC (S703).

The Cell Off Timer parameter can be set in a number of ways. For example, the Cell Off Timer can start (1) when the MSC sends the Cell Off Request message to the SSC or (2) when the MCS receive the cell off indication message from the SSC.

Regardless of the option stated above, the SSC should clearly inform the MSC about when the SSC will finish turning their power off. The aim of using the Time to Start Cell Off parameter and the Cell Off Timer parameter is that the MSC should finish switching of RRC connection for corresponding UEs before the SSC starts turning their power off.

The SSC detects and decides the MSC which is to be a target serving cell and the necessity of RRC connection switching based on the Cell Off request message (S705).

If the SSC decided the MCS and RRC connection switching, the SSC sends the Aggregated UE Context transfer message to the MSC in order to transfer the UE contexts to be controlled by the MSC (S707).

This procedure can be interpreted by the corresponding MSC as the implicit RRC connection switching request for the UEs serviced from the SSC. In this case, the sending of the Aggregated UE Context transfer message should be done before the SSC initiates turning their power off.

Optionally, when the MSC receives the Aggregated UE Context transfer message, the MSC can then return the Aggregated UE Context Transfer Ack message to indicate to the SSC about the successful reception of UE contexts related to the RRC connection switching (S709).

The SSC then informs to the RRC connected UEs under their coverage about the information regarding the identities of the MSC and information related to the period during which the UEs should finish RRC connection switching to the corresponding MSC by transmitting a RRC Connection Switching message (S711).

The RRC Connection Switching message can include any data that can be used to identify the MSC. This can be interpreted by the UEs as RRC connection switching request to the specified MSC. So, the UEs which have received the RRC Connection Switching message are able to detach from old cell and synchronize to a new cell that is the TSC (S713).

The sequence of sending the information about MSC and the Aggregated UE contexts can be reversed by the SSC. That means, after the SSC notifies the RRC connected UEs about the information identifying the MSC first, the SSC is able to send the Aggregated UE contexts to the corresponding MSC.

In addition, after transmitting the RRC Connection Switching message to the UEs, the SSC delivers the buffered packets to the MSC (S715).

The SSC then sends the Aggregated SN Status Transfer message to the MSC. The Aggregated SN Status Transfer message represents the packet sequence number to be transmitted to the MSC (S717).

After the MSC performs synchronization with the UEs (S719), the MSC transmits the RRC Connection Switching Complete message to the corresponding UEs regarding this procedure, respectively (S721).

The RRC Connection Switching Complete message includes uplink resource allocation information and timing advance (TA) information to be used in the MSC. So, the UEs receiving the RRC Connection Switching Complete message can transmit the RRC Connection Reconfiguration Complete message based on the uplink allocation information and the TA information to the MSC (S723).

After receiving the RRC Connection Reconfiguration Complete message from the UEs, the MSC transmits an UE Context Release message requesting releasing the UE context managed by the SSC (S725).

When the SSC receives the UE Context Release message from the MSC, the SSC releases the resource for the UEs and then start turning its power off (S727).

When the SSC completes turning its power off (S729), the SSC is able to send a Cell Off Complete Indication message indicating the cell off complete to the corresponding MSC, optionally (S731).

When the UEs obtain the information about the identities of the MSC and the period during which the UEs should finish the RRC connection switching to the MSC by receiving the RRC Connection Switching message at the step S711. Then, the UEs can start synchronization to the MSC. The RRC Connection Switching message contains any data that can be used to identify the MSC. Such information can be sent from the network to the UEs by broadcasting message, such as a common control signaling (e.g., System Information (SI)). Besides, such information can be sent from the network to the UEs through RRC message.

When the RRC Connection Switching process is successfully finished to the MSC, the UEs resume communication with the network through the MSC.

Figure 8:
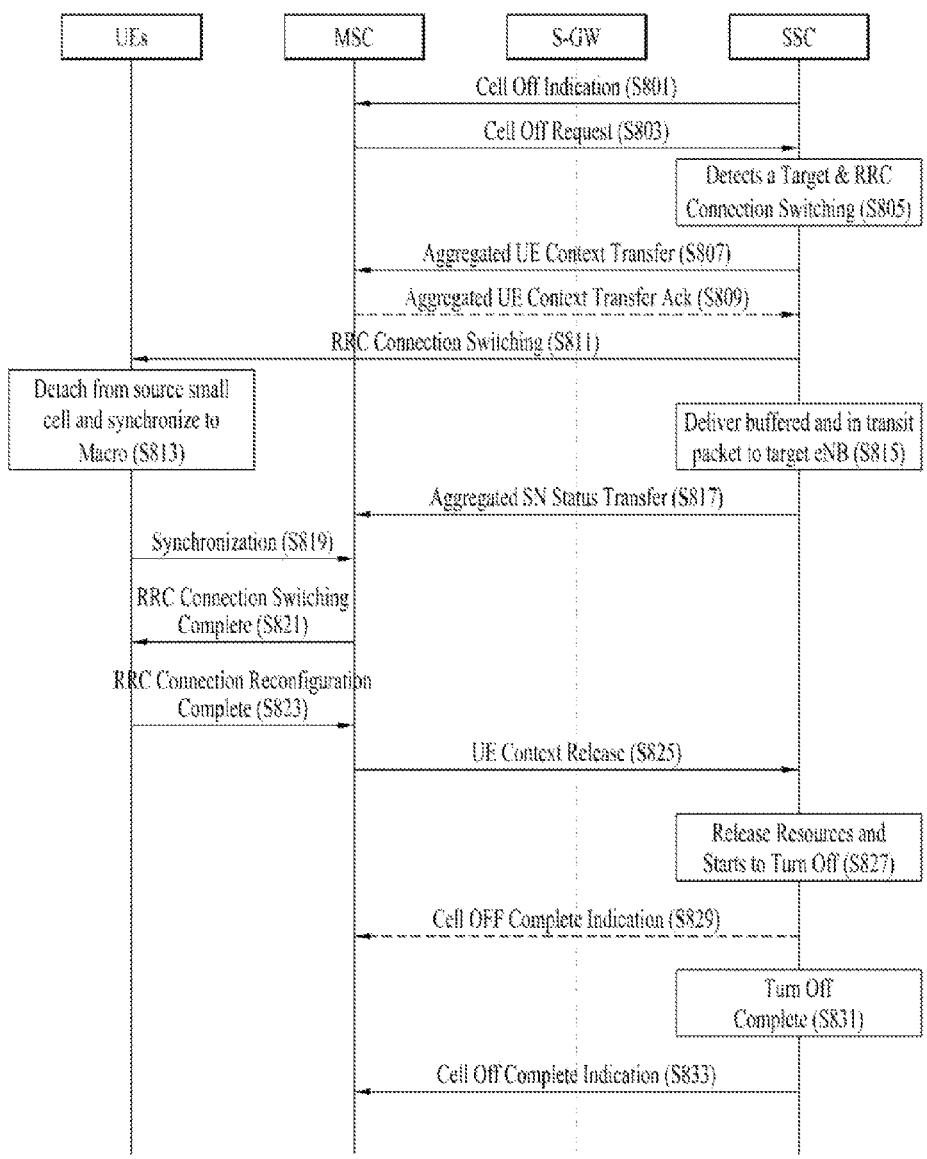
FIG. 8 illustrates another cell off procedure controlled by a MeNB.

FIG. 8 illustrates another cell off procedure controlled by a MeNB.

The network of FIG. 8 includes the Small cell Gate Way (S-GW), one MeNB, one or more source small cells (SSCs) and one or more UEs. However, for convenience of explanation of the present invention, FIG. 8 depicts just one SSC and one MeNB but there exist un-shown SSCs. In addition, the SSC is going to attempt turn off soon and the MeNB is going to provide the service to the UEs on behalf of the SSC. In this case, the MeNB can be referred to a macro serving cell (MSC), a target serving cell or a first cell, and the SSC can be referred to an on-and-off small cell or a second cell.

Referring to FIG. 8, the SSC which is going to turn off soon transmit a Cell Off Indication message to the MSC in order to notify the turn off state. The Cell Off Indication message includes a Cell State Change Indication parameter indicating the cell status, a Time to Start Cell Off parameter, a Cell Off Timer parameter, and a few of other necessary information. As an example, such information can contain the information needed for admission control at the MSC (S801).

By receiving the Cell Off Indication message, the MSC can detect that the SSC which is the on-and-off small cell will be turned off soon by decoding the cell state change indication parameter. When the MSC detects that the SSC will be turned off soon, it sends the Cell Off Request message to the SSC in order to accommodate the UEs serviced from the corresponding SSC. This can be transferred via air interface or the S-GW. The Cell Off Request can be the return message for the Cell Off Indication message from the SSC (S803).

The Cell Off Timer parameter can be set in a number of ways. For example, the Cell Off Timer can start (1) when the MSC sends the Cell Off Request message to the SSC or (2) when the MCS receive the cell off indication message from the SSC.

Regardless of the options stated above, the SSC should clearly inform the MSC about when the SSC will finish turning their power off. The aim of using the Time to Start Cell Off parameter and the Cell Off Timer parameter is that the MSC should finish switching of RRC connection for corresponding UEs before the SSC starts turning their power off.

The SSC detects and decides the MSC which is to be a target serving cell and the necessity of RRC connection switching based on the Cell Off request message (S805).

If the SSC decided the MCS and RRC connection switching, the SSC sends the Aggregated UE Context transfer message to the MSC in order to transfer the UE contexts to be controlled by the MSC (S807).

This procedure can be interpreted by the corresponding MSC as the implicit RRC connection switching request for the UEs serviced from the SSC. In this case, the sending of the Aggregated UE Context transfer message should be done before the SSC initiates turning their power off.

Optionally, when the MSC receives the Aggregated UE Context transfer message, the MSC can then return the Aggregated UE Context Transfer Ack message to indicate to the SSC about the successful reception of UE contexts related to the RRC connection switching (S809).

The SSC then informs to the RRC connected UEs under their coverage about the information regarding the identities of the MSC and information related to the period during which the UEs should finish RRC connection switching to the corresponding MSC by transmitting a RRC Connection Switching message (S811).

The RRC Connection Switching message can include any data that can be used to identify the MSC. This can be interpreted by the UEs as RRC connection switching request to the specified MSC. So, the UEs which have received the RRC Connection Switching message are able to detach from old cell and synchronize to a new cell that is the TSC (S813).

The sequence of sending the information about MSC and the Aggregated UE contexts can be reversed by the SSC. That means, after the SSC notifies the RRC connected UEs about the information identifying the MSC first, the SSC is able to send the Aggregated UE contexts to the corresponding MSC.

In addition, after transmitting the RRC Connection Switching message to the UEs, the SSC delivers the buffered packets to the MSC (S815).

The SSC then sends the Aggregated SN Status Transfer message to the MSC. The Aggregated SN Status Transfer message represents the packet sequence number to be transmitted to the MSC (S817).

After the MSC performs synchronization with the UEs (S819), the MSC transmits the RRC Connection Switching Complete message to the corresponding UEs regarding this procedure, respectively (S821).

The RRC Connection Switching Complete message includes uplink resource allocation information and timing advance (TA) information to be used in the MSC. So, the UEs receiving the RRC Connection Switching Complete message can transmit the RRC Connection Reconfiguration Complete message based on the uplink allocation information and the TA information to the MSC (S823).

After receiving the RRC Connection Reconfiguration Complete message from the UEs, the MSC transmits an UE Context Release message requesting releasing the UE context managed by the SSC (S825).

When the SSC receives the UE Context Release message from the MSC, the SSC releases the resource for the UEs and then start turning its power off (S827).

Optionally, when the SSC starts turning their power off, the SSC is able to transmit a Cell off Start Indication message to the MSC for indicating the starting of the cell off of the SSC (S829).

When the SSC completes turning its power off (S831), the SSC is able to send a Cell Off Complete Indication message indicating the cell off complete to the corresponding MSC (S833).

When the UEs obtain the information about the identities of the MSC and the period during which the UEs should finish the RRC connection switching to the MSC by receiving the RRC Connection Switching message at the step S811. Then, the UEs can start synchronization to the MSC. The RRC Connection Switching message contains any data that can be used to identify the MSC. Such information can be sent from the network to the UEs by broadcasting message, such as a common control signaling (e.g., System Information (SI)). Besides, such information can be sent from the network to the UEs through RRC message.

When the RRC Connection Switching process is successfully finished to the MSC, the UEs resume communication with the network through the MSC. In the procedure described in FIGS. 7 and 8, the UEs do not need to report the measurement result for the RRC Connection Switching procedure to the MSC.

As described above, the cell off procedures are controlled by the MSC. However, all of the messages transmitted between the MSC and the SSC can be transferred through the S-GW. In this case, the S-GW just transparently transfers the messages to/from the MSC and the SSC.

3.4 Small Cell on Procedures

Figure 9:
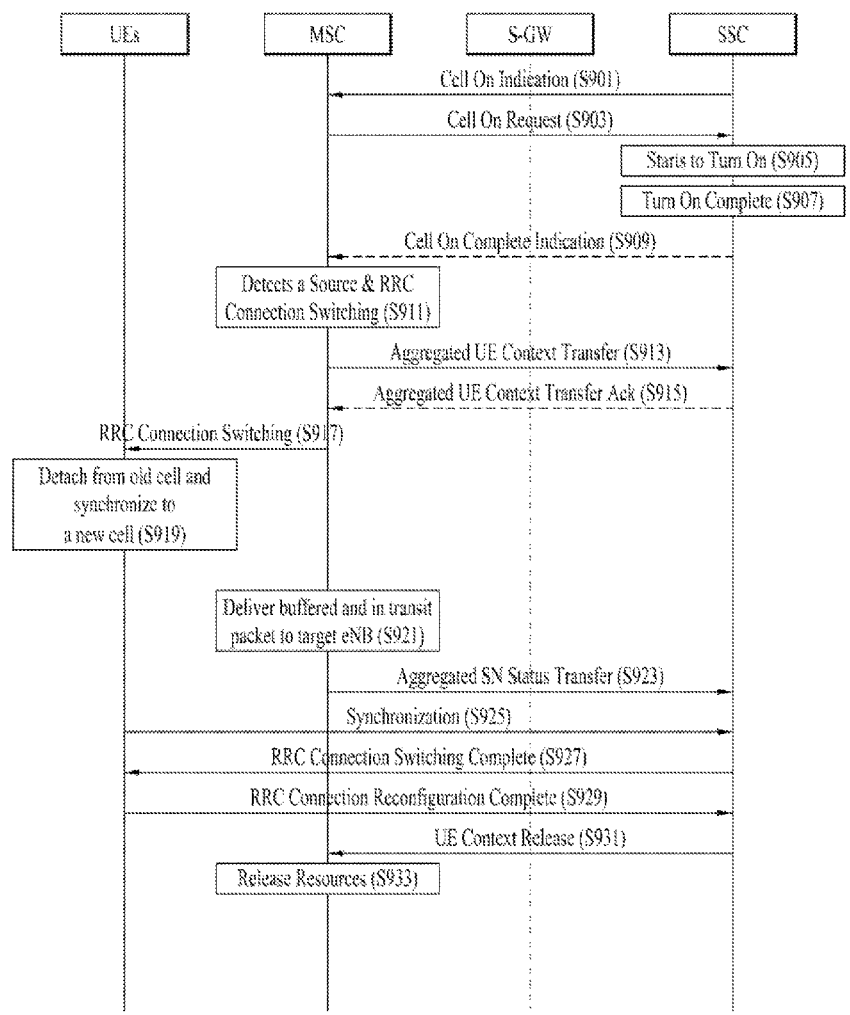
FIG. 9 illustrates a cell on procedure controlled by a MeNB.

FIG. 9 illustrates a cell on procedure controlled by a MeNB.

The network of FIG. 9 includes the Small cell Gate Way (S-GW), one MeNB, one or more source small cells (SSCs) and one or more UEs. However, for convenience of explanation of the present invention, FIG. 9 depicts just one SSC and one MeNB but there exist un-shown SSCs. In addition, the SSC is going to attempt turn on soon and provide the service to the UEs on behalf of the MeNB. In this case, the MeNB can be referred to a macro serving cell (MSC), a target serving cell or a first cell, and the SSC can be referred to an on-and-off small cell or a second cell.

Referring to FIG. 9, the SSC which is going to turn on soon again transmits a Cell On Indication message to the MSC in order to notify the turn on state. The Cell On Indication message includes a Cell State Change Indication parameter indicating the cell status, a Time to Start Cell On parameter, a Cell On Timer parameter, and a few of other necessary information. As an example, such information can contain the information needed for admission control at the SSC (S901).

By receiving the Cell On Indication message, the MSC can detect that the SSC which is the on-and-off small cell will be turned on soon by decoding the cell state change indication parameter. When the MSC detects that the SSC will be turned on soon, the MSC transmits the Cell On Request message to the SSC in order to inform to the SSC that the UEs will leave from the MSC. This can be transferred via air interface or the S-GW. The Cell On Request can be the return message for the Cell On Indication message from the SSC (S903).

The Cell On Timer parameter can be set in a number of ways. For example, the Cell On Timer can start (1) when the MSC sends the Cell On Request message to the SSC or (2) when the MCS receive the cell on indication message from the SSC.

Regardless of the option stated above, the SSC should clearly inform the MSC about when the SSC will finish turning their power on. The aim of using the Time to Start Cell On parameter and the Cell On Timer parameter is that the MSC should not start the switching of RRC connections for corresponding UEs before the SSC finishes turning their power on.

After receiving the Cell on Request message from the MSC, the SSC starts to turn on its serving cell (S905).

When the turn on process has been completed (S907), the SSC optionally transmits Cell On Complete Indication message to the MSC in order to inform the power of the serving cell is completely on (S909).

The MSC is able to detect and decide the SSC which is to be a source serving cell and the necessity of RRC connection switching (S911).

If the MSC decided the SSC corresponding to the UEs and necessity of a RRC connection switching, the MSC sends the Aggregated UE Context transfer message to the SSC in order to transfer the UE contexts to be controlled by the SSC (S913).

This procedure can be interpreted by the corresponding SSC as the implicit RRC connection switching request for the UEs serviced from the MSC. In this case, the sending of the Aggregated UE Context transfer message should be done after the SSC finishes turning their power on.

Optionally, when the SSC receives the Aggregated UE Context transfer message, the SSC can then return the Aggregated UE Context Transfer Ack message to indicate to the MSC about the successful reception of UE contexts related to the RRC connection switching (S915).

The MSC then informs to the RRC connected UEs under their coverage about the information regarding the identities of the SSC from which the UEs will be served and information related to the period during which the UEs should finish RRC connection switching to the corresponding SSC by transmitting a RRC Connection Switching message (S917).

The RRC Connection Switching message can include any data that can be used to identify the SSC. This can be interpreted by the UEs that a RRC connection switching to the specified SSC is requested. So, the UEs which have received the RRC Connection Switching message are able to detach from old cell and synchronize to a new cell that is the SSC (S919).

The sequence of sending the information about SSC and the Aggregated UE contexts can be reversed by the MSC. That means, after the MSC notifies the RRC connected UEs about the information identifying the SSC first, the MSC is able to send the Aggregated UE contexts to the corresponding SSC.

In addition, after transmitting the RRC Connection Switching message to the UEs, the MSC delivers the buffered packets to the SSC (S921).

The MSC then sends the Aggregated SN Status Transfer message to the SSC. The Aggregated SN Status Transfer message represents the packet sequence number to be transmitted to the SSC (S923).

After the SSC performs synchronization with the UEs (S925), the SSC transmits the RRC Connection Switching Complete message to the corresponding UEs regarding this procedure, respectively (S927).

The RRC Connection Switching Complete message includes uplink resource allocation information and timing advance (TA) information to be used in the SSC. So, the UEs receiving the RRC Connection Switching Complete message can transmit the RRC Connection Reconfiguration Complete message based on the uplink allocation information and the TA information to the SSC (S929).

After receiving the RRC Connection Reconfiguration Complete message from the UEs, the SSC transmits an UE Context Release message requesting releasing the UE context managed by the MSC (S931).

When the MSC receives the UE Context Release message from the SSC, the MSC releases the resource for the UEs (S933).

In the procedure described in FIG. 9, the UEs do not need to report the measurement result for RRC Connection Switching procedure (as in the case of HO preparation) to the MSC.

After the UEs obtain the information about the identities of SSC and the period during which the UEs should finish RRC connection switching to the SSC, they start synchronization to the corresponding SSC. This information contains any data that can be used to identify the SSC. Such information can be sent from the network to the UEs through broadcasting message (e.g., common control signaling or system information messages). Besides, such information can be sent from the network to the UEs through RRC message.

When the RRC connection switching is successfully finished to the SSC, the UEs resume communication with the network via the SSC.

Figure 10:
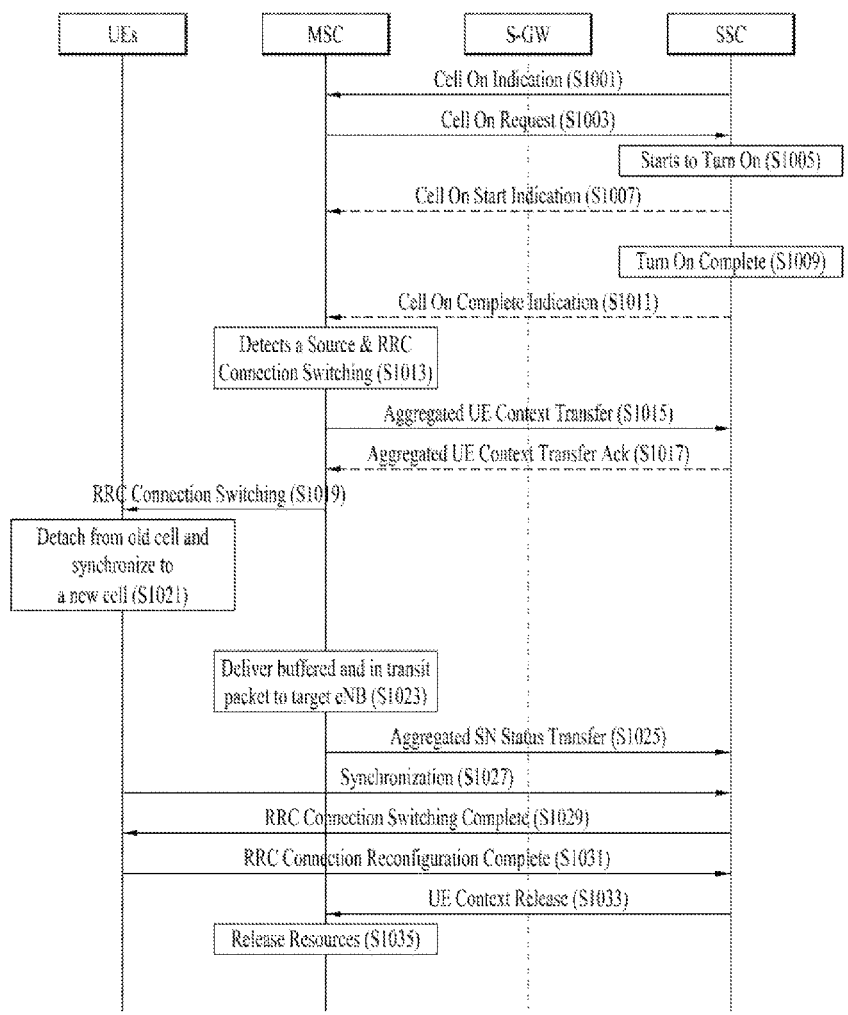
FIG. 10 illustrates another cell on procedure controlled by a MeNB.

FIG. 10 illustrates another cell on procedure controlled by a MeNB.

The network of FIG. 10 includes the Small cell Gate Way (S-GW), one MeNB, one or more source small cells (SSCs) and one or more UEs. However, for convenience of explanation of the present invention, FIG. 10 depicts just one SSC and one MeNB but there exist un-shown SSCs. In addition, the SSC is going to attempt turn on soon and provide the service to the UEs on behalf of the MeNB. In this case, the MeNB can be referred to a macro serving cell (MSC), a target serving cell or a first cell, and the SSC can be referred to an on-and-off small cell or a second cell.

Referring to FIG. 10, the SSC which is going to turn on soon again transmits a Cell On Indication message to the MSC in order to notify the turn on state. The Cell On Indication message includes a Cell State Change Indication parameter indicating the cell status, a Time to Start Cell On parameter, a Cell On Timer parameter, and a few of other necessary information. As an example, such information can contain the information needed for admission control at the SSC (S1001).

By receiving the Cell On Indication message, the MSC can detect that the SSC which is the on-and-off small cell will be turned on soon by decoding the cell state change indication parameter. When the MSC detects that the SSC will be turned on soon, the MSC transmits the Cell On Request message to the SSC in order to inform that the UEs will leave from the MSC. This can be transferred via air interface or the S-GW. The Cell On Request can be the return message for the Cell On Indication message from the SSC (S1003).

The Cell On Timer parameter can be set in a number of ways. For example, the Cell On Timer can start (1) when the MSC sends the Cell On Request message to the SSC or (2) when the MCS receive the cell on indication message from the SSC.

Regardless of the option stated above, the SSC should clearly inform the MSC about when the SSC will finish turning their power on. The aim of using the Time to Start Cell On parameter and the Cell On Timer parameter is that the MSC should not start the switching of RRC connections for corresponding UEs before the SSC finishes turning their power on.

After receiving the Cell on Request message from the MSC, the SSC starts to turn on its serving cell (S1005).

Optionally, when the SSC starts turning their power on, the SSC transmits a Cell On start Indication message notifying that the Cell On process has been started (S1007).

When the turn on process has been completed (S1009), the SSC optionally transmits Cell On Complete Indication message to the MSC in order to inform the power of the serving cell is completely on (S1011).

The MSC is able to detect and decide the SSC which is to be a source serving cell and the necessity of RRC connection switching (S1013).

If the MSC decided the SSC corresponding to the UEs and necessity of a RRC connection switching, the MSC sends the Aggregated UE Context transfer message to the SSC in order to transfer the UE contexts to be controlled by the SSC (S1015).

This procedure can be interpreted by the corresponding SSC as the implicit RRC connection switching request for the UEs serviced from the MSC. In this case, the sending of the Aggregated UE Context transfer message should be done after the SSC finishes turning their power on.

Optionally, when the SSC receives the Aggregated UE Context transfer message, the SSC can then return the Aggregated UE Context Transfer Ack message to indicate to the MSC about the successful reception of UE contexts related to the RRC connection switching (S1017).

The MSC then informs to the RRC connected UEs under their coverage about the information regarding the identities of the SSC from which the UEs will be served and information related to the period during which the UEs should finish RRC connection switching to the corresponding SSC by transmitting a RRC Connection Switching message (S1019).

The RRC Connection Switching message can include any data that can be used to identify the SSC. This can be interpreted by the UEs that is a RRC connection switching to the specified SSC is requested. So, the UEs which have received the RRC Connection Switching message are able to detach from old cell and synchronize to a new cell that is the SSC (S1021).

The sequence of sending the information about SSC and the Aggregated UE contexts can be reversed by the MSC. That means, after the MSC notifies the RRC connected UEs about the information identifying the SSC first, the MSC is able to send the Aggregated UE contexts to the corresponding SSC.

In addition, after transmitting the RRC Connection Switching message to the UEs, the MSC delivers the buffered packets to the SSC (S1023).

The MSC then sends the Aggregated SN Status Transfer message to the SSC. The Aggregated SN Status Transfer message represents the packet sequence number to be transmitted to the SSC (S1025).

After the SSC performs synchronization with the UEs (S1027), the SSC transmits the RRC Connection Switching Complete message to the corresponding UEs regarding this procedure, respectively (S1029).

The RRC Connection Switching Complete message includes uplink resource allocation information and timing advance (TA) information to be used in the SSC. So, the UEs receiving the RRC Connection Switching Complete message can transmit the RRC Connection Reconfiguration Complete message based on the uplink allocation information and the TA information to the SSC (S1031).

After receiving the RRC Connection Reconfiguration Complete message from the UEs, the SSC transmits an UE Context Release message requesting releasing the UE context managed by the MSC (S1033).

When the MSC receives the UE Context Release message from the SSC, the MSC releases the resource for the UEs (S1035).

In the procedure described in FIG. 10, the UEs do not need to report the measurement result for RRC Connection Switching procedure (as in the case of HO preparation) to the MSC.

After the UEs obtain the information about the identities of SSC and the period during which the UEs should finish RRC connection switching to the SSC, they start synchronization to the corresponding SSC. This information contains any data that can be used to identify the SSC. Such information can be sent from the network to the UEs through broadcasting message (e.g., common control signaling or system information messages). Besides, such information can be sent from the network to the UEs through RRC message.

When the RRC connection switching is successfully finished to the SSC, the UEs resume communication with the network via the SSC.

As described above, the cell on procedures are controlled by the MSC. However, all of the messages transmitted between the MSC and the SSC can be transferred through the S-GW. In this case, the S-GW just transparently transfers the messages to/from the MSC and the SSC.

4. Implementation Apparatus

The apparatus described with reference to FIG. 11 can implement the methods described in FIGS. 1 to 10.

A UE may operate as a transmitter in uplink and operate as a receiver in downlink. In addition, a BS (eNB) may operate a receiver in uplink and operate as a transmitter in downlink.

That is, the UE and the BS may respectively include transmitter 1140 and 1150 and receiver 1160 and 1170, in order to control transmission and reception of information, data and/or message. The UE and the BS may include antennas 1100 and 1110 for transmitting/receiving information, data and/or messages, respectively.

The UE and the BS may include processors 1120 and 1130 for performing the above-described embodiments of the present invention and memories 1180 and 1190 for temporarily or permanently storing processing procedures of the processors, respectively.

The embodiments of the present invention may be implemented using the above-described components and functions of the UE and the BS. The processor of the BS (i.e., the MSC) can detect whether to cell on or off according to the state of the other BSs (i.e., the SSCs). In this case, the SSC informs the states of the SSC by sending the Cell on/off Indication message to the MSC. The specific cell on/off processes can be referred to the explanations corresponding to FIGS. 7 to 10. Although FIG. 11 does not disclose the elements of the S-GW, the all elements included in the BS can be adapted to the S-GW. Accordingly, the function described for the BS also can be applied to the S-GW in view of communication between the BS and the S-GW.

The transmitter and the receiver included in the UE and the BS may perform a packet modulation/demodulation function for data transmission, a high-speed packet channel coding function, an orthogonal frequency division multiple access (OFDMA) packet scheduling function, a time division duplexing (TDD) packet scheduling function and/or a channel multiplexing function. The UE and the BS of FIG. 11 may further include a low-power radio frequency (RF)/Intermediate frequency (IF) module.

Meanwhile, in the present invention, as a UE, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in the memory units 1180 and 1190 so that it can be driven by the processors 1120 and 1130. The memory units are located inside or outside of the processors, so that it can communicate with the aforementioned processor via a variety of well-known parts.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The present invention is applicable to various wireless access systems. Examples of the various wireless access systems include a 3$^{rd}$ Generation Partnership Project (3GPP) system, a 3GPP2 system and/or an Institute of Electrical and Electronic Engineers (IEEE) 802.xx system. The embodiments of the present invention are applicable to all technical fields using the various wireless access systems in addition to the various wireless access systems.

What is claimed is:

1. A method for controlling a small cell off procedure by a Macro Serving Cell (MSC), the method comprising:
    receiving, by the MSC from a Source Small Cell (SSC), a cell indication message including a cell state change indication parameter indicating whether the SSC is to be off and a cell off timer parameter indicating a time duration for a cell off process;
    transmitting, by the MSC to the SSC, a cell off request message in order to accommodate an user equipment (UE) serviced from the SSC based on the cell state change indication parameter;
    receiving, by the MSC from the SSC, an aggregated UE context transfer message requesting to perform a radio resource control (RRC) connection switching from the SSC to the MSC during a time duration indicated by the cell off timer parameter;
    receiving, by the MSC from the SSC, an aggregated sequence number (SN) status transfer message representing a packet sequence number to be transmitted to the MSC; and
    transmitting, by the MSC to the SSC, an UE context release message requesting releasing a context of the UE managed by the SSC after a RRC connection between the MSC and the UE has been established.

2. The method according to claim 1, wherein the cell off request message further includes a time to start cell off parameter indicating when the cell off process is performed.

3. The method according to claim 1, further comprising:
    receiving a cell off complete indication message from the SSC which has been transmitted before the SSC is turned off.

4. The method according to claim 1, wherein the MSC is a target base station which provides services on behalf of the SSC.

5. A method for controlling a small cell off procedure supported by a Source Serving Cell (SSC), the method comprising:
    transmitting, by the SSC to a Macro Small Cell (MSC), a cell indication message including a cell state change indication parameter indicating whether the SSC is to be off and a cell off timer parameter indicating a time duration for a cell off process;
    receiving, by the SSC from the MSC, a cell off request message in order to accommodate an user equipment (UE) serviced from the SSC based on the cell state change indication parameter;
    transmitting, by the SSC to the MSC, an aggregated UE context transfer message requesting to perform a radio resource control (RRC) connection switching from the SSC to the MSC during a time duration indicated by the cell off timer parameter;
    transmitting, by the SSC to the MSC, an aggregated sequence number (SN) status transfer message representing a packet sequence number to be transmitted to the MSC; and
    receiving, by the SSC from the MSC, an UE context release message requesting releasing a context of the UE managed by the SSC after a RRC connection between the MSC and the UE has been established.

6. The method according to claim 5, wherein the cell off request message further includes a time to start cell off parameter indicating when the cell off process is performed.

7. The method according to claim 5, further comprising:
    transmitting a cell off complete indication message from the SSC which has been transmitted before the SSC is turned off.

8. The method according to claim 5, wherein the MSC is a target base station which provides services on behalf of the SSC.

9. A Macro Serving Cell (MSC) for controlling a small cell off procedure, the MSC comprising:
    a receiver;
    a transmitter; and
    a processor for controlling the small cell off procedure,
    wherein the processor is configured to:
        receive, from a Source Small Cell (SSC), a cell indication message including a cell state change indication parameter indicating whether the SSC is to be off and a cell off timer parameter indicating a time duration for a cell off process;
        transmit, to the SSC, a cell off request message in order to accommodate an user equipment (UE) serviced from the SSC based on the cell state change indication parameter;
        receive, from the SSC, an aggregated UE context transfer message requesting to perform a radio resource control (RRC) connection switching from the SSC to the MSC during a time duration indicated by the cell off timer parameter
        receive, from the SSC, an aggregated sequence number (SN) status transfer message representing a packet sequence number to be transmitted to the MSC; and
        transmit, to the SSC, an UE context release message requesting releasing a context of the UE managed by the SSC after a RRC connection between the MSC and the UE has been established.

10. The MSC according to claim 9, wherein the cell off request message further includes a time to start cell off parameter indicating when the cell off process is performed.

11. The MSC according to claim 9, wherein the processor further configured to receive a cell off complete indication message from the SSC which has been transmitted before the SSC is turned off.

12. The MSC according to claim 9, wherein the MSC is a target base station which provides services on behalf of the SSC.

* * * * *